Feb. 8, 1938.  J. G. HAWLEY  2,107,295
BRAKE LINING AND METHOD OF MAKING SAME
Filed Aug. 26, 1933

Inventor
Jesse G. Hawley,
By Albert T. St Clair
Attorney

Patented Feb. 8, 1938

2,107,295

UNITED STATES PATENT OFFICE 2,107,295

BRAKE LINING AND METHOD OF MAKING SAME

Jesse G. Hawley, Painted Post, N. Y., assignor to Hawley-Jones Corporation, Riverside, N. Y., a corporation of New York Application August 26, 1933, Serial No. 687,009

9 Claims. (Cl. 139—420)

This invention relates to the art of brake linings.

Most prior brake linings with which I am familiar have generally been made of uniform construction on both sides, thus being adapted to have the same coefficient of friction on both surfaces. A few brake linings, however, which are intended to have frictional contact on only one surface, have been provided with a non-operating surface of different character than the operating surface as, for instance, with wire mesh on the side that goes next to the shoe to which it is to be riveted.

I have discovered, however, that when brake linings of the first mentioned type are used as a floating lining in brakes, for example such as is disclosed in my application Serial No. 590,481, filed February 2, 1932, that the braking action is not as positive as is desired unless precautions are taken to secure a uniform coefficient of friction between the brake shoe and the inner surface of the brake lining, and the brake drum and the outer surface of the brake lining. Furthermore, brake linings of the second type mentioned above are not adapted for use as floating linings where both surfaces of the brake lining are intended to function as friction creating means.

It is therefore an object of this invention to provide a new and improved brake lining.

It is another object to provide a brake lining with a different coefficient of friction on opposite operating surfaces thereof.

It is a further object to provide a brake lining with a relative predetermined coefficient of friction which will be different for both operating surfaces thereof.

It is also an object of this invention to provide a brake lining with a different coefficient of friction on opposite operating surfaces thereof in order to achieve a uniform coefficient of friction in the actual operation of the brake lining as used in a brake.

With the above and other objects in view, which will be apparent as the description proceeds, I have set forth my invention in the following specification, and have described and illustrated one embodiment thereof by way of example but not as a limitation.

Figure 1:
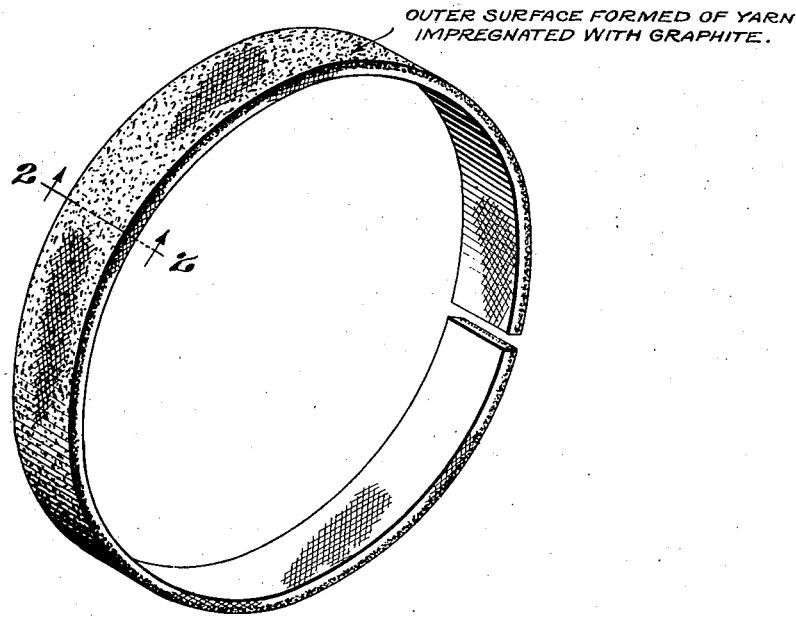
Figure 2:
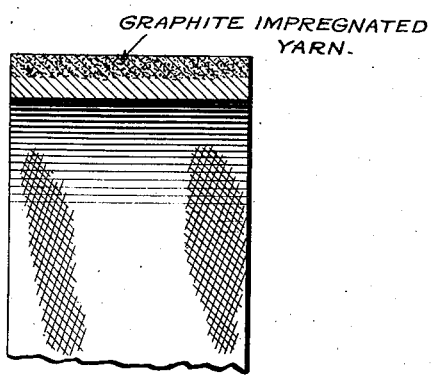
Figure 3:
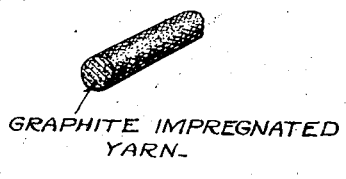

In the accompanying drawing, Figure 1 illustrates a perspective view of a section of brake lining embodying my invention; Fig. 2 illustrates a transverse section therethrough on line 2—2 of Fig. 1; and Fig. 3 is a perspective view, on a greatly enlarged scale, of a piece of graphite impregnated yarn adapted for use in accordance with my invention.

According to a preferred embodiment of my invention, a brake lining of the woven, asbestos type is made by impregnating asbestos yarn before weaving with a predetermined amount of graphite and then manufacturing the actual brake lining by weaving the graphite impregnated yarn into only one surface of the resulting brake lining, after which the brake lining is finished in the usual, or any desired, way, including the friction imparting treatment near the end of the manufacturing operations. In other words, in my preferred embodiment, the inclusion of the graphite on one side of the brake lining reduces the coefficient of friction, on that side of the lining, that would otherwise be imparted to it by the subsequent manufacturing operations, and provides a brake lining with a differential coefficient of friction on opposite operating surfaces thereof.

By properly proportioning the amount of graphite used, the resulting brake lining, when utilized as a floating or unanchored brake lining between two relatively rotatable members of a brake or shock absorber, will have the same degree of slippage on both operating surfaces.

The amount of the graphite treatment is varied according to the size of the drum, the load to which the brake or shock absorber is to be subjected, and the particular friction imparting treatment used in manufacturing the brake lining.

In the preferred embodiment of my invention as applied, for example, to a brake of the general type disclosed in my aforesaid application, the graphite treated yarns extend thru substantially the outer half of the thickness of the brake lining and the amount of the graphite treatment is so proportioned as to get a slippage of about one-half of the drum speed when the brake is applied.

Without desiring to be limited thereto, my present belief of the theory of the operation of my improved brake lining is as follows:

When the lining is bent to conform to the shape of a round brake drum, the inner surface of the brake lining occupies a lesser area than the outer area of the brake lining. Hence, if the coefficient of friction on both sides of the brake lining is the same, the resulting operation, in the application of the brake, is that the greater area of the outside of the brake lining causes the brake lining to tightly engage the inner surface of the drum, in the case of an internally expanding brake, and to slip with respect to the brake shoe. This prevents the obtaining of the maximum uniform braking action, which is usually desired. This unequal coefficient of friction in the actual operation of a brake is overcome by reducing the coefficient of friction of the outer side of the brake lining, in the case of an internally expanding brake or a circular type shock absorber, so as to compensate for the greater area of the outer surface as compared with the area of the inner surface. The result is a uniform coefficient of friction in the resulting brake or shock absorber and the attaining of the maximum braking action for a given construction.

It will be apparent that the selective coefficients of friction on the two sides of my brake lining can be obtained in various other ways than by the graphite treatment disclosed herein, as by the impregnation of the yarn with other materials, or by the impregnation of the outer surface of the brake lining with materials which reduce its coefficient of friction, or by the impregnation of the inner surface of the brake lining with materials which increase its coefficient of friction. Similarly, the difference in the coefficient of friction may be attained by other methods than impregnation of the unwoven yarn, or the resulting woven surface, as by a dipping or a spreading action.

It will also be apparent that in constructions in which there is an external contraction, instead of an internal expansion, the opposite situation is encountered, and the desired result in such a case is obtained by reversing the sides of my improved brake lining when same is assembled in such a modified construction.

As indicated, a preferred use of my brake lining is in the general type of brake disclosed in my aforesaid brake application, but my invention is of general application and is not limited thereto, as it is applicable to either internally expanding or externally contracting brakes having floating or unanchored linings, and to shock absorbers of the circular type provided with a floating lining.

It is also a part of my invention to provide a brake lining with different coefficients of friction on opposite operating surfaces thereof for any other type of construction in which same might be desirable.

Also, although I have disclosed by invention herein as applied to a woven asbestos yarn, my invention is not limited thereto and may be applied to many other types of brake lining, such as moulded lining.

As many apparently widely different embodiments of this invention may be made without departing from the spirit thereof, it is to be understood that I do not limit myself to the foregoing embodiments or description except as indicated in the following patent claims.

I claim:

1. A brake lining provided on one side thereof with graphite to reduce its coefficient of friction on that side, the other side of said lining being free of said material.

2. A brake lining provided on one side thereof with a graphite treated woven asbestos yarn to reduce its coefficient of friction on that side, the other side of said lining being free of said material.

3. A brake lining provided on one side thereof with a graphited woven asbestos yarn to reduce its coefficient of friction on that side, the other side of said lining being free of said material.

4. The method of making brake lining having a different coefficient of friction on opposite operating surfaces thereof which comprises treating a portion of the material to be used in the manufacture of the brake lining with a material to alter the coefficient of friction to be imparted to it, manufacturing said brake lining from both treated and untreated material but using the treated material on only one side of the brake lining, and treating both surfaces of the brake lining with the same friction imparting operations.

5. The method of claim 4, in which the treatment first given involves an impregnation.

6. The method of claim 4, in which the treatment first given involves the impregnation of yarn with graphite.

7. The method of making a brake lining having different coefficients of friction on opposite operating surfaces thereof which comprises treating a portion of the material to be woven with a non-metallic material to alter its final coefficient of friction prior to manufacturing it into brake lining, and manufacturing said material into brake lining in conjunction with untreated material with the treated material on only one side of said brake lining.

8. A brake lining formed of woven material provided with different coefficients of friction on opposite operating sides thereof, one of said sides containing graphite and the other side being free thereof.

9. A brake lining of woven asbestos yarn provided with different coefficients of friction on opposite operating sides thereof, one of said sides containing graphite and the other side being free thereof.

JESSE G. HAWLEY.